US008464150B2

(12) United States Patent
Davidson et al.

(10) Patent No.: US 8,464,150 B2
(45) Date of Patent: Jun. 11, 2013

(54) AUTOMATIC LANGUAGE IDENTIFICATION FOR DYNAMIC TEXT PROCESSING

(75) Inventors: Douglas R. Davidson, Palo Alto, CA (US); Ali Ozer, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 652 days.

(21) Appl. No.: 12/211,694

(22) Filed: Sep. 16, 2008

(65) Prior Publication Data

US 2009/0307584 A1    Dec. 10, 2009

Related U.S. Application Data

(60) Provisional application No. 61/059,762, filed on Jun. 7, 2008.

(51) Int. Cl.
*G06F 17/00* (2006.01)
*G06F 17/27* (2006.01)

(52) U.S. Cl.
USPC ........... 715/264; 715/234; 715/257; 715/259; 704/5; 704/9

(58) Field of Classification Search
USPC ................ 715/200, 204, 205, 226, 254, 255, 715/256, 257, 259, 264, 265, 273, 731, 760, 715/234, 700, 762; 704/1, 4, 5, 8–10, 203
See application file for complete search history.

(56) References Cited

U.S. PATENT DOCUMENTS

| | | | |
|---|---|---|---|
| 6,292,772 B1 * | 9/2001 | Kantrowitz | 704/9 |
| 6,782,510 B1 * | 8/2004 | Gross et al. | 715/257 |
| 6,889,361 B1 * | 5/2005 | Bates et al. | 715/257 |
| 7,243,305 B2 * | 7/2007 | Schabes et al. | 715/257 |
| 7,254,773 B2 * | 8/2007 | Bates et al. | 715/256 |
| 7,404,143 B2 * | 7/2008 | Freelander et al. | 715/257 |
| 7,681,126 B2 * | 3/2010 | Roose | 715/257 |
| 7,779,353 B2 * | 8/2010 | Grigoriu et al. | 715/255 |
| 8,006,180 B2 * | 8/2011 | Tunning et al. | 715/257 |
| 8,082,498 B2 * | 12/2011 | Salamon et al. | 715/257 |
| 2002/0177993 A1 * | 11/2002 | Veditz et al. | 704/8 |
| 2003/0145285 A1 * | 7/2003 | Miyahira et al. | 715/533 |
| 2003/0195741 A1 * | 10/2003 | Mani et al. | 704/8 |
| 2006/0167676 A1 * | 7/2006 | Plumb | 704/6 |
| 2007/0271510 A1 * | 11/2007 | Grigoriu et al. | 715/533 |
| 2008/0077859 A1 * | 3/2008 | Schabes et al. | 715/257 |
| 2008/0098302 A1 * | 4/2008 | Roose | 715/257 |
| 2008/0195940 A1 * | 8/2008 | Gail et al. | 715/257 |
| 2008/0244390 A1 * | 10/2008 | Fux et al. | 715/257 |
| 2009/0300488 A1 * | 12/2009 | Salamon et al. | 715/257 |

* cited by examiner

*Primary Examiner* — Maikhanh Nguyen
(74) *Attorney, Agent, or Firm* — Morgan, Lewis & Bockius LLP

(57) ABSTRACT

Methods and systems which utilize, in one embodiment, automatic language identification, including automatic language identification for dynamic text processing. In at least certain embodiments, automatic language identification can be applied to spellchecking in real time as the user types.

13 Claims, 7 Drawing Sheets

AUTOMATIC LANGUAGE IDENTIFICATION FOR DYNAMIC TEXT PROCESSING

This application is related to and claims the benefit of the filing date of U.S. Provisional Application No. 61/059,762, filed on Jun. 7, 2008.

BACKGROUND

Automatic language identification generally is the process of examining unlabeled data and determining the language or languages for any linguistic content it may contain. Examples can be found in research and in industry of automatic language identification as applied to varied data types, including speech data, images that may contain text, and textual data. Here we are concerned only with automatic language identification as applied to textual data.

Automatic language identification is commonly used for identifying the language used in an unknown document, for example a web page obtained from the internet. Many text document formats include mechanisms by which they may be manually labeled as to their language, but these mechanisms often are not used or contain unreliable information, so automatic language identification may often be needed. In many cases this is combined with the detection of the text encoding in use, since mechanisms for labeling encodings suffer from the same problems. Automatic language identification is often used in data mining applications, which may need to scan a large collection of heterogeneous documents; for example, Google is known to use automatic language identification as part of its initial processing phase when it reads web pages to be indexed.

Automatic language identification of this sort typically uses a combination of methods, notably methods based on gathering statistics about characters and combinations of characters, and dictionary-based methods using word lists from various languages. These methods are all fairly well known, and there is a significant body of research about them. Apple Inc. shipped an automatic language identification API with Mac OS X starting in 10.5.

Word processing and other text document applications often provide various features that depend on language, such as spelling and grammar checking, hyphenation, and so forth. However, these applications usually require that documents or portions of documents be manually labeled as to their language in order for these features to work correctly in general. Typically a default language will be chosen based on the user's preference, and text in any other language will need to be manually labeled; in general an arbitrary portion of text, as small as a paragraph, sentence, or single word, can be so marked.

Microsoft Word does not appear to use automatic language identification at all. Arbitrary portions of text may be manually labeled as to their language, and this language is used for spelling and grammar checking, and for various other processes, either immediately as the user types or subsequently when processing is requested. Microsoft Word is typical of most applications in its class in this regard.

Google Does appears to use automatic language identification for spellchecking, but only on a whole-document basis; users may choose either a single language to be used for spellchecking an entire document, or "Auto", and in the "Auto" case a single language is chosen automatically for the entire document. Google Does apparently uses this language information only for spellchecking, and spellchecking is performed only when manually requested, not immediately while the user types.

A text system ("Cocoa Text System") in a prior version of Mac OS X included an existing spellchecking feature that is similar in some ways to automatic language identification, referred to as multilingual spellchecking. When multilingual spellchecking is turned on, words are identified as correctly spelled if they are correct in any of the languages known to the spellchecker. However, multilingual spellchecking does not use automatic language identification to identify the language of the text from context before spellchecking; it merely assigns a misspelled word the language in which the last previous word was found to be correctly spelled. In addition, this existing multilingual capability applies only to spellchecking and not to any other feature.

SUMMARY OF THE DESCRIPTION

Present invention relates to various embodiments which utilize automatic language identification, including automatic language identification for dynamic text processing.

A method according to one embodiment includes determining, by a machine, a language of a first portion of a document, and determining by the machine, a language of a second portion of a document and using the determination of the language of each of the first and second portions to perform automatic or user invoked modifying functions, such as a spellchecking function, on at least one of the first and the second portions. This method may further include determining which of the first and the second portions is being operated on currently by a user and dynamically selecting modifying functions based on the portion being currently operated on. This method, which is a machine implemented method, may also include dynamically selecting, as a user types in either the first or the second portions between a spellchecking function for a first language in the first portion and a spellchecking function for a second language in the second portion.

According to another embodiment, a machine implemented method includes invoking a document modifying function to modify a document and determining, automatically in response to invoking the document modifying function, a language of the document. This method may further include determining, in response to determining the language, a particular version of the document modifying function. For example, a system may receive text as a user types text and automatically determine, by the machine, the language of the text entry. This determination is automatic and done by the machine and done in response to receiving the text entry without requiring the user to request a language identification. The method may further include using the language determined by the machine to perform a particular modifying function based upon the language automatically determined. For example, spellchecking may be automatically performed for the determined language if the autocorrect feature (correct as type) is enabled.

According to another aspect of the present invention, an embodiment of a machine implemented method includes providing an interface, such as an application programming interface, to allow a plurality of user applications to request an automatic language identification service and responding to a request from a user application with an identification of a language of a least a portion of a document being processed by the user application. In one implementation, the automatic identification service may be configured to identify different languages for different portions of the document and the automatic language identification service may be a system level service available to the plurality of applications through a call to the service.

According to another embodiment, a machine implemented method includes a spellchecker (or other document modifying function) which determines if the language determined by the automatic identification service is correct. If the spellchecker determines another language would be more appropriate the spellchecker sends the language back to the automatic language identifier for use by the rest of the system.

Other methods are also described herein and data processing systems which perform these methods and other aspects of the inventions are also described as well as machine readable media.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Figure 1A:
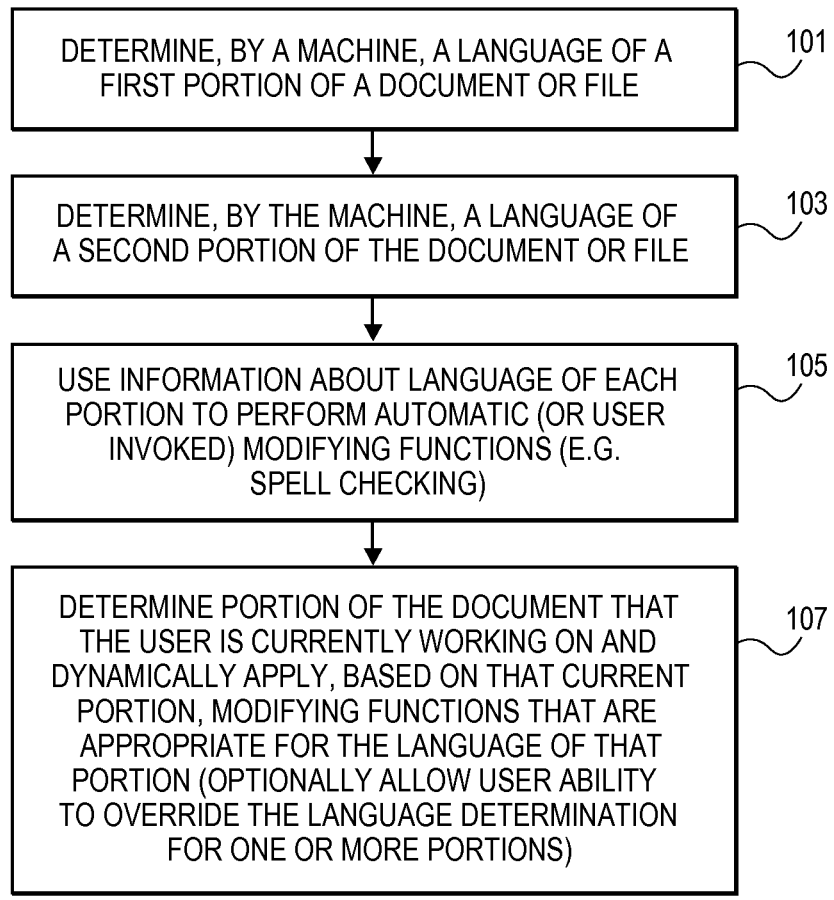
FIG. 1A is a flowchart which shows an example of a method according to one embodiment of the present invention.
Figure 1B:
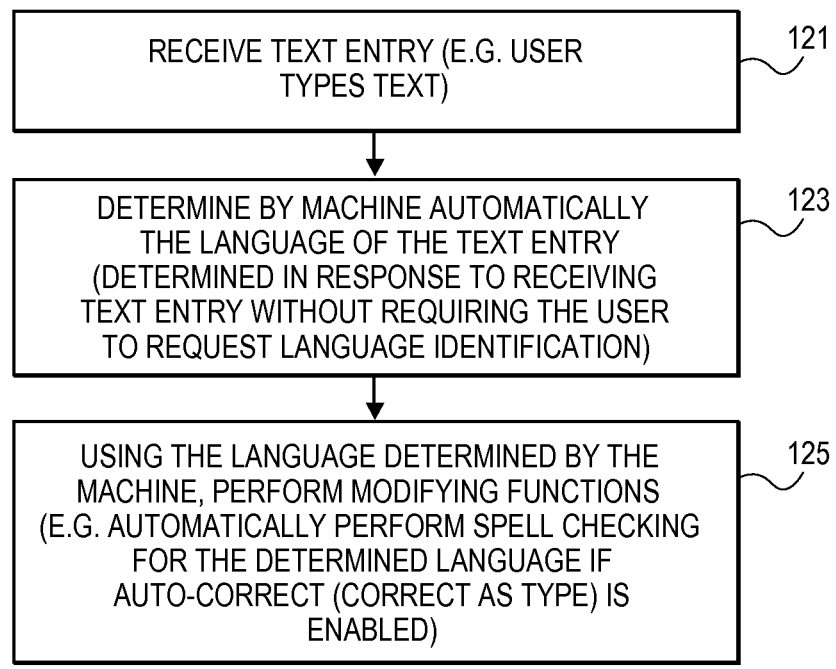
FIG. 1B is a flowchart which illustrates an example of a method according to an embodiment of the present invention.
Figure 6:
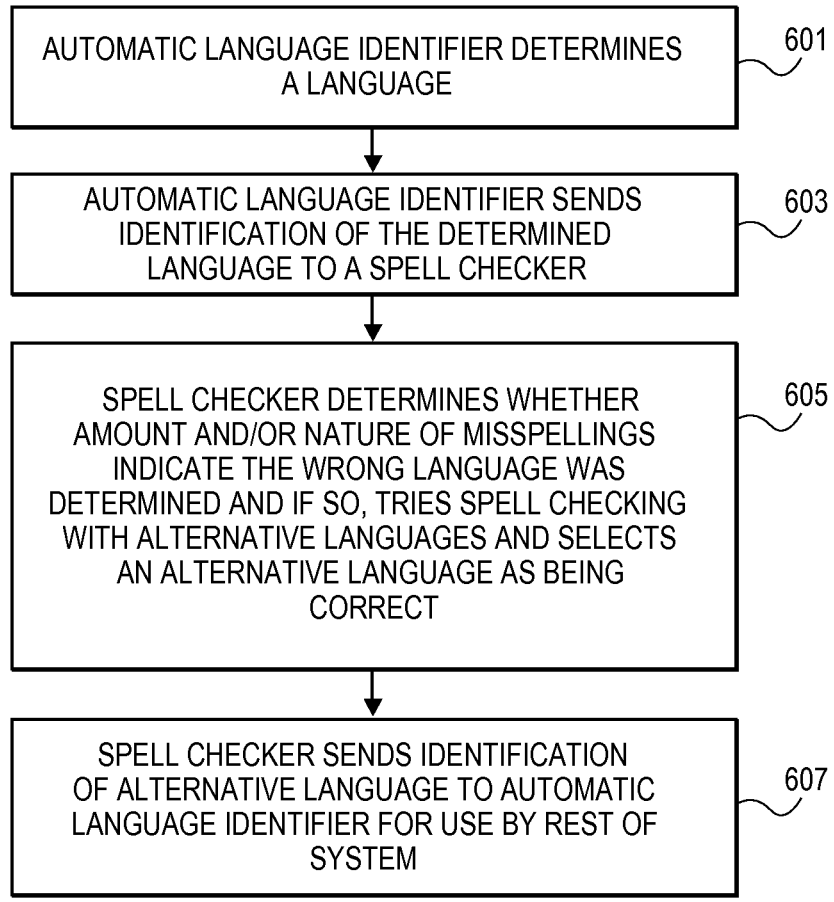
FIG. 6 is a flowchart which illustrates a feedback mechanism according to one embodiment of the present invention.

At least certain embodiments of the invention can provide the following features. Automatic language identification can be applied to spellchecking in real time as the user types. An example of this is shown in FIG. 1B. The application of automatic language identification to spellchecking may also be done on a fine grained basis. At least certain embodiments allow the use of different languages on a per-paragraph or per-sentence basis which are different portions of same document. FIG. 1A shows an example of such a method in which different languages may be identified or determined in different portions of the same document. In at least certain embodiments, the application of automatic language identification to spellchecking can be performed on a per script basis. For example, certain embodiments can detect separate languages for separate scripts—for example if both Russian (written in the Cyrillic alphabet) and English (written the Latin alphabet) are in use, certain embodiments can detect both of these different languages. In at least certain embodiments, a spellchecking system can provide feedback to an automatic language identification system; in other words, a spellchecking process may include a mechanism to modify the result of the automatic language detection if the spellchecking process can determine that the automatic language detection process incorrectly determined the language. An example of such a method is shown in FIG. 6. In at least certain embodiments, the use of automatic language identification can be used in processes other than spellchecking. These processes or text processing functions can include but is not limited to grammar checking; automatic spelling and grammar corrections; hyphenation; conversion of ASCII quotation marks to other quotation marks ("smart quotes"); making language-dependent typographic choices, such as varying fonts, glyphs, or ligatures; capitalization; sorting; autocompletion; displaying dictionary and thesaurus information; detection of special items such as names, dates, and addresses; text-to-speech conversion; providing accessibility information to users with various impairments; transliteration; and special-purpose operations such as converting between simplified and traditional Chinese forms.

Figure 4:
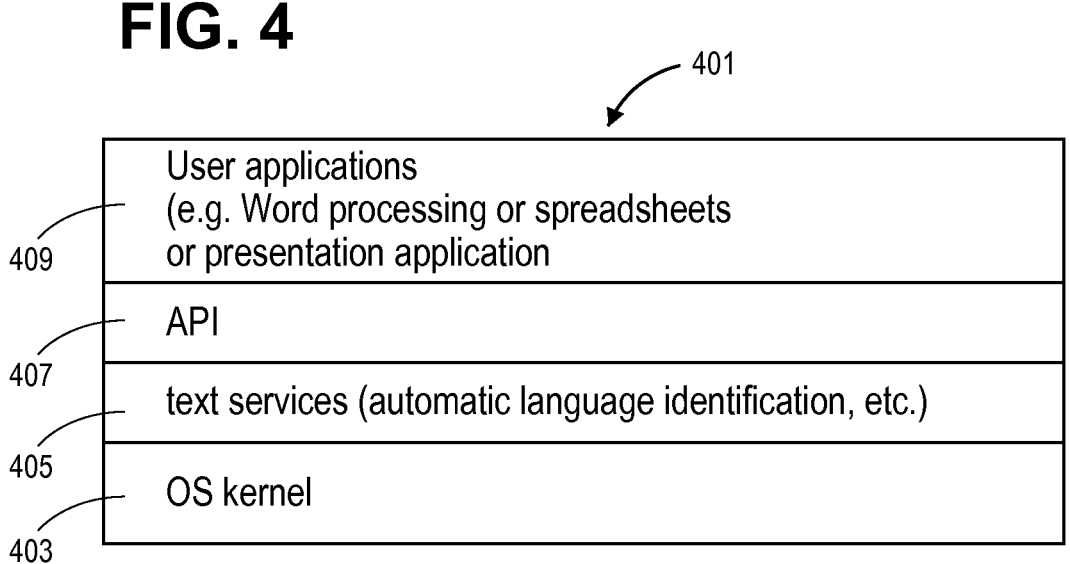
FIG. 4 shows an example, according to one embodiment, of a software architecture which can provide system level and universal text services for user applications.

In at least certain embodiments, all of these processes can be made available to most or all uses of text on a data processing system. For example, these processes can be available through API's which can be used by user applications running on the data processing system by making calls to the text services on the system. FIG. 4 shows an example of a software architecture which supports such systems level availability for text services including automatic language identification and spellchecking which can utilize the automatic language identification before attempting to correct spelling, etc.

At least certain embodiments of the present invention allow users to enter text in a variety of languages without having to worry about labeling text by language or switching any language settings.

One embodiment of the invention may be an improved version of the Mac OS X operating system from Apple Inc. of Cupertino, Calif., and this improved version may be implemented by adding features to the Cocoa text system in Mac OS X, and hence potentially to all Mac OS X applications that make use of the Cocoa text system, that will (a) use automatic language identification (b) to identify the languages of arbitrary portions of text, potentially as small as a single paragraph, sentence, or single word, (c) in order to make use of that information for spelling and grammar checking, and other related text processing features. This identification may occur either (1) immediately as the user types the text, or (2) subsequently when processing is being performed on the text. At least certain embodiments of the present invention allow these features to be available to every application that allows the entry of text, not just word processing applications like TextEdit. FIG. 4 shows an example of a software architecture which allows all or most applications which allow entry of text to use one or more embodiments of the invention.

This sort of automatic language identification will ordinarily proceed in two phases in one embodiment. In the first phase, standard language identification mechanisms will be used to attempt to identify the languages present in a portion of text from various characteristics of the text. Multiple languages may be identified within the same portion of text; for example, text containing a combination of Latin and Cyrillic might be identified as being in French and Ukrainian respectively. If a sufficiently clear identification cannot be made, default languages will be chosen based on other text in the document, previous documents from the same user, or the user's localization preferences. In the optional second phase, spelling and/or grammar checking will be performed on the portion of text in question, using the languages so identified, and depending on the results of those checks, the initial identification may be determined to be incorrect and may be revised, either for the entire portion or for smaller pieces of it.

FIG. 1A shows a method according to one embodiment of the present invention in which different portions of the same document may be recognized by an automatic language identification service to include two different languages or more languages. In operation 101, a data processing system, such as the data processing system shown in FIG. 7, determines a language of a first portion of a document or a file. In operation 103, the data processing system determines a language of a second portion of the document or the file which may be a different language than in the first portion. In operation 105, the information about the language can be used to perform automatic or user invoked modifying functions, such as spellchecking functions. For example, a first portion may be checked with a spellchecker for a first language while a second portion is checked for spellchecking for a second language. In operation 107, the data processing system may determine a portion of the document that the user is currently working on and dynamically apply, based on the current portion, modifying functions that are appropriate for the language of that portion. For example, the data processing system may determine that the user has moved the text cursor (e.g. a text insertion cursor or other cursor) from one portion to another portion and the system dynamically determines the language of the current portion and based on that determination selects appropriate modifying functions, such as the spellchecker for the current language. In some embodiments, the system may optionally allow the user to override the language determination for one or more portions of the document.

FIG. 1B illustrates an embodiment in which a system may automatically determine the language of text being entered without requiring the user to request language identification. This would allow, in an auto correction mode in which auto correction is enabled, the user to type in different languages and the system would automatically recognize the particular language and perform the appropriate checking of spelling based upon the language. In operation 121, the system receives text entry; this may occur by the user typing the entry or coping and pasting text entry, etc. In operation 123, the system determines automatically the language of the text being entered. This determination can be in response to receiving the text entry without requiring the user to request language identification. Then in operation 125, the system can perform modifying functions using the language determined by the machine. For example, the system can automatically perform spellchecking as the user types for the determined language if auto detection is enabled. If the user changes the language being used, or entered, the system will recognize that as it receives text in operation 121 by performing operation 123 and will accordingly update the modifying functions. Hence, in at least certain embodiments, the detection and determination of the language is performed automatically and dynamically as the user types in order to enable automatic or user invoked text modifying functions which are appropriate for the current language.

Figure 2:
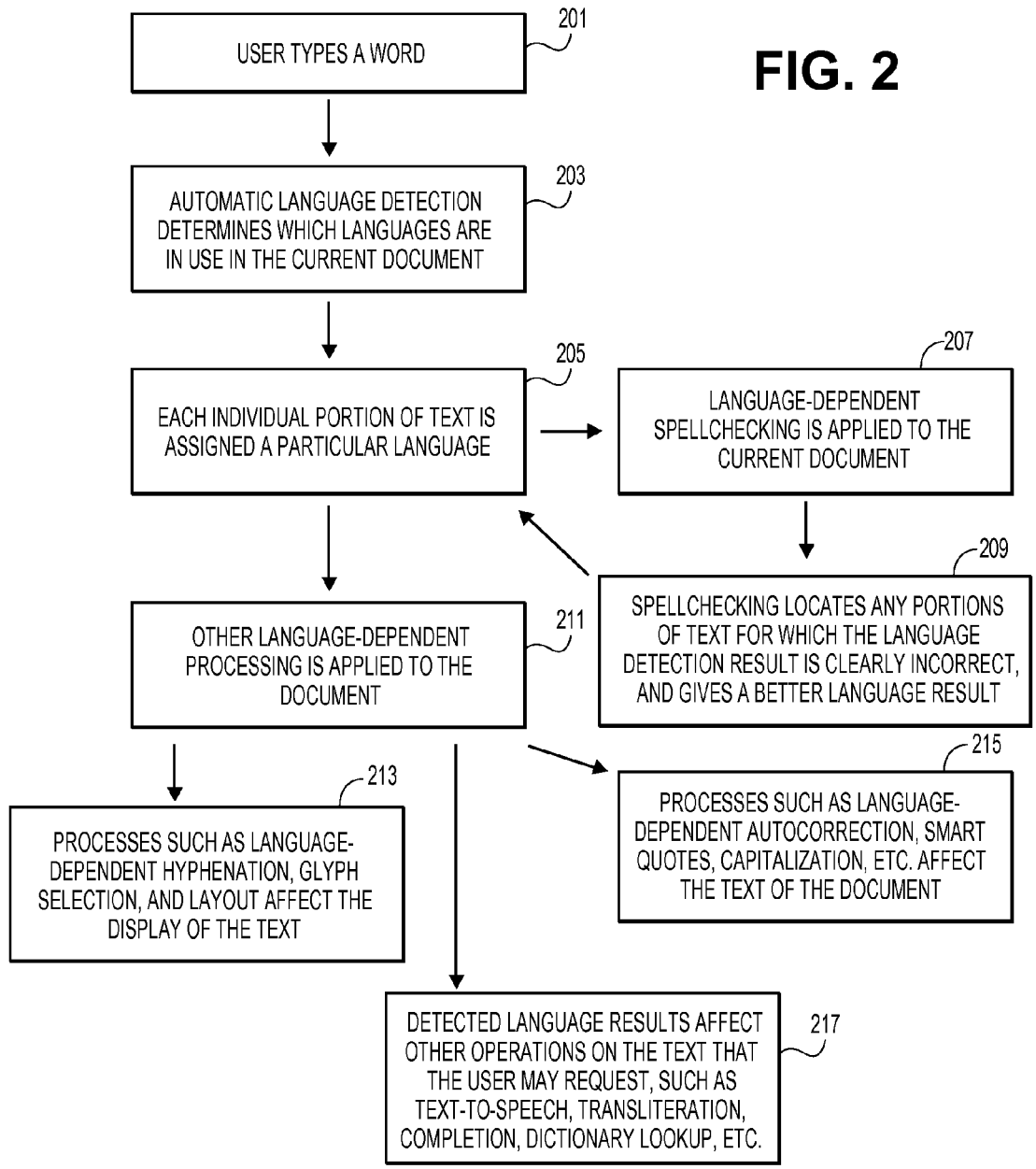
FIG. 2 is a flowchart which shows a method according to yet another embodiment of the present invention.

FIG. 2 shows a flowchart which illustrates another embodiment of the present invention. In operation 201, a user types a word and the system in operation 203 responds by automatically detecting which languages are in use in the current document. In operation 205, each individual portion of text is assigned to a particular language. In operation 207 and 209, the system performs spellchecking to the current document and this spellchecking is language dependant to each portion assigned in operation 205. Operation 209 shows an optional feature in which the spellchecking locates any portions of text for which the language detection results is clearly incorrect and gives a better language result; a further example of the method of operation 209 is shown in FIG. 6. In operation 211, the data processing system may perform other language dependant processing, such as hyphenation, capitalization, grammar correction, punctuation correction, etc.; in each case, the processing is dependant upon the language for the particular portion assigned in operation 205. Operation 213 shows examples of other language dependant processing which can be performed. Similarly, operation 215 and 217 also show other language dependant processing which can be performed in at least certain embodiments.

Figure 3:
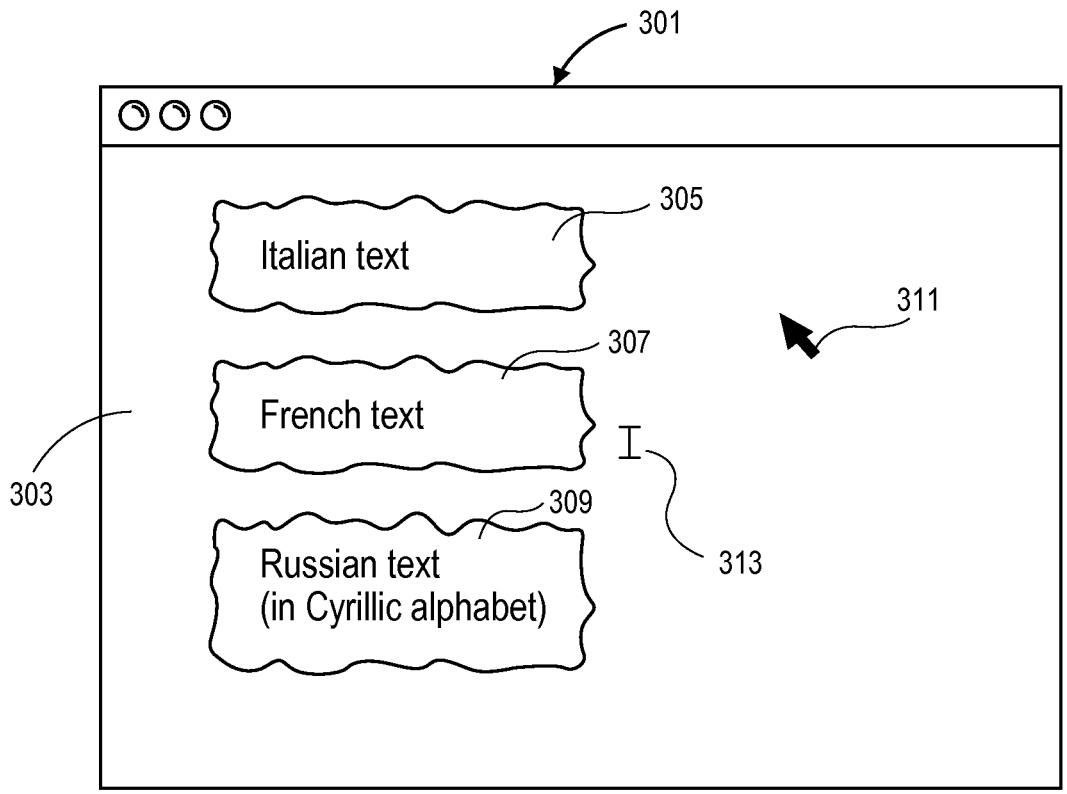
FIG. 3 is an example of a user interface in which a document includes a plurality of different languages.

FIG. 3 shows an example of the user interface in which multiple languages have been entered into the same document. Window 301 includes the text region 303 which has text in three different languages. In particular, Italian text 305 is near the top of the window and the French text 307 is in the middle window while the Russian text (in Cyrillic alphabet) is at the bottom of the document. The document may be a word processing document, a presentation document, (e.g., Power Point, or Keynote) or a spreadsheet, etc. The user may move a text entry cursor 313 or an arrow cursor 311 to position text for entry or to perform other manipulations on the text as is know in the art. As the user moves the text insertion cursor 313 or the pointer 311 the system can dynamically determine the language of the current portion being selected. As the user types, the system can continue to determine the language being used in update the language dependent processing based upon the current determination of the language being entered. In one embodiment, if the user moves the cursor or pointer 311 into the Italian text region 305 and presses a mouse button or otherwise causes the selection of text within the Italian portion 305, the system will dynamically switch from the prior language to the current language within the Italian text (the current language being Italian). Similarly, if the text insertion cursor 313 is moved from the French text 307 to the Russian text 309, the data processing system can determine that the current language has changed from French to Russian and accordingly changed the language dependant text processing functions, such as spellchecking, etc.

FIG. 4 shows an example of a software architecture in which a plurality of user applications, such as word processing applications or spreadsheet applications or presentations applications or word creation applications, etc., may utilize text services 405 through an application program interface (API). The text service 405 may include automatic language identification, spell checking and other language dependent processes user functions described herein. By providing the application program interface 407 to all of the user applications 409, each of those user applications can have access to the automatic language identification described herein as well as the other text modifying functions which may be language dependant. As is known in the art, an operating system kernel 403 supports the operation of the text services and the user applications of the data processing systems, such as the data processing systems shown in FIG. 7. It will be understood that the software architecture 401 shown in FIG. 4 may be stored in one or more of the memory 50 and the memory 49 shown in FIG. 7.

Figure 5:
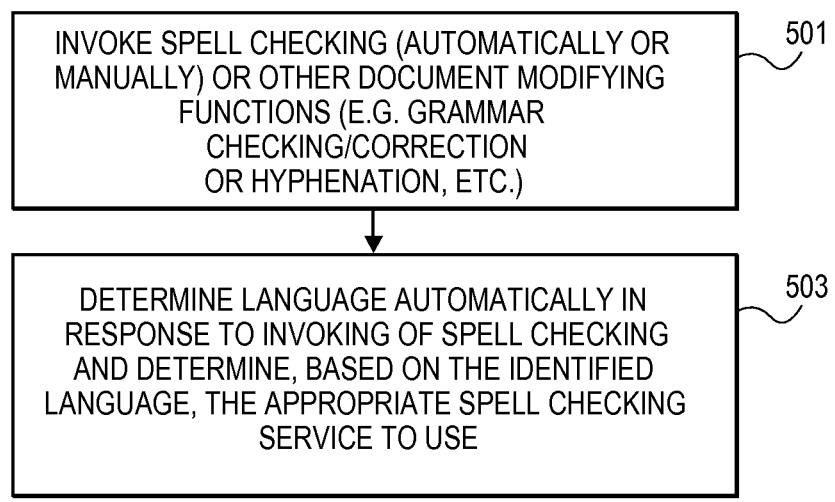
FIG. 5 is a flowchart which shows an example of another method according to an embodiment of the present invention.

FIG. 5 shows an example of a method in which invoking a document modifying function to modify a document automatically invokes an automatic language identification process in order to determine the language of the document or portion of the document in order to perform the document modifying function with the right language of the document being selected. In operation 501, the data processing system receives an invoking of a spellchecking or other document modifying function. This may be invoked either automatically or manually by user interaction. The document modifying function may be spellchecking, grammar checking, hyphenation, etc. Examples of these other functions are shown in operations 213, 215, and 217 in FIG. 2. Then in operation 503, a language is determined automatically in response to the invoking of spellchecking. Based upon the determined language, an appropriate selection of the spellchecking service is used.

FIG. 6 shows an example of a method in which feedback from a document modifying function, such as spellchecking, is used to correct what appears to be an error in the result from the automatic language identifier service. In operation 601, an automatic language identifier service determines a language. In at least certain embodiments the initial step of language identification may produce not just a language result, but also an indication of the strength or degree of confidence in that result, and possibly other secondary language guesses. That degree of confidence may then be used to raise or lower the thresholds that a spellchecker may use to decide whether to override the initial language identification.

In operation 603, the automatic language identifier service sends the identification of the determined language to a spellchecker in one embodiment.

In operation 605 the spellchecker determines whether or not the language was properly identified. In one embodiment, it determines this based upon the amount and/or nature of the misspellings which indicate that the wrong language was determined. Factors for determining if the wrong language was determined may include the length of the text analyzed. Shorter length text may have a smaller threshold to overcome before the spellchecker determines the wrong language was determined whereas longer length text may have a larger threshold.

If the spellchecker determines that the language was incorrectly determined, then it attempts to correct spelling with alternative languages and selects an alternative language that achieves an appropriate level of misspellings. The spellchecker may try the secondary sources previously determined by the automatic language identifier service in operation 601. In at least certain embodiments, other possibilities for alternatives may be taken from information about the user. For example, the user's indicated language and spelling preferences, languages used elsewhere in the same document, and languages that the user has used previously in other documents. This alternative language is then sent in operation 607 back to the automatic language identifier which can then use the alternative language as the correct language for the document or portion of the document for use by the rest of the system (e.g., grammar checking, etc.).

Figure 7:
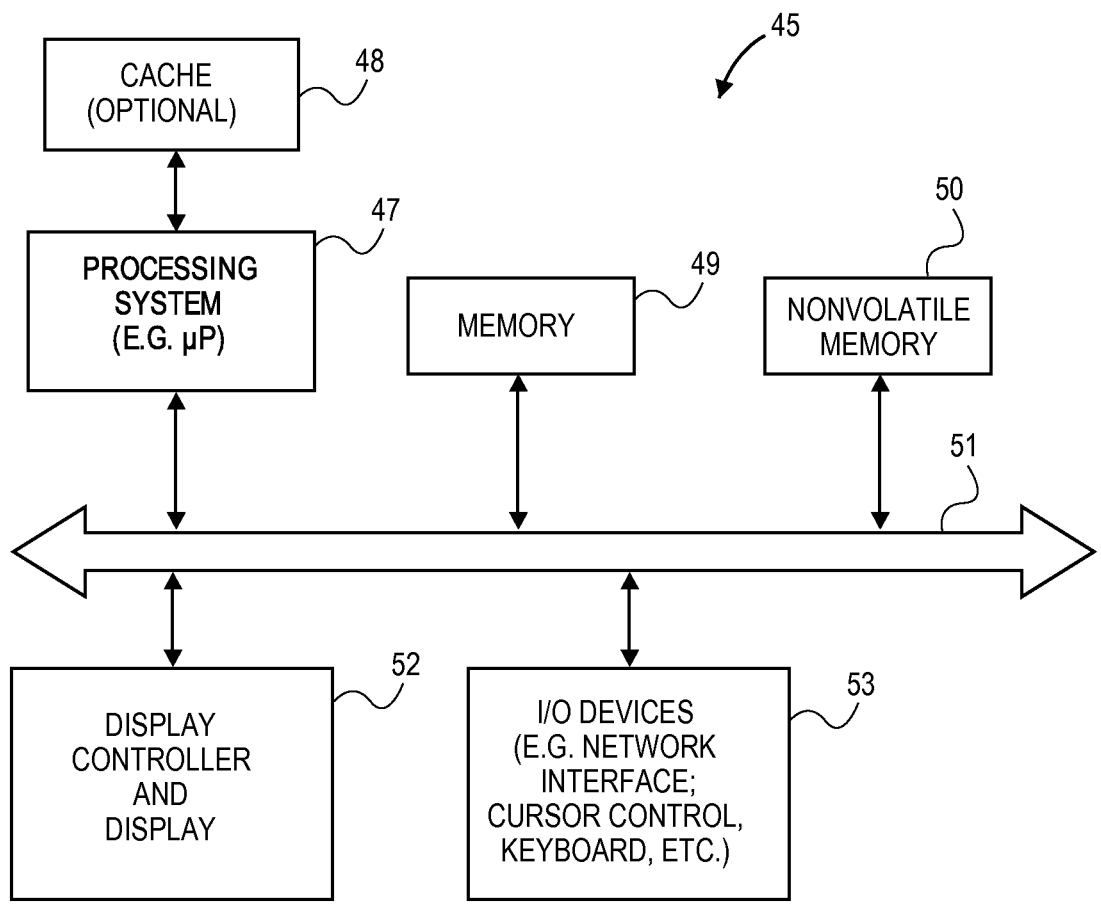
FIG. 7 shows an example of a data processing system which may be used in at least certain embodiments of the invention.

FIG. 7 shows one example of a typical computer system which may be used with the present invention. Note that while FIG. 7 illustrates various components of a computer system, it is not intended to represent any particular architecture or manner of interconnecting the components as such details are not germane to the present invention. It will also be appreciated that personal digital assistants (PDAs), cellular telephones, handheld computers, media players (e.g. an iPod), entertainment systems, devices which combine aspects or functions of these devices (e.g. a media player combined with a PDA and a cellular telephone in one device), an embedded processing device within another device, network computers, a consumer electronic device, and other data processing systems which have fewer components or perhaps more components may also be used with or to implement one or more embodiments of the present invention. The computer system of FIG. 7 may, for example, be a Macintosh computer from Apple Inc. The system may be used when programming or when compiling or when executing the software described.

As shown in FIG. 7, the computer system 45, which is a form of a data processing system, includes a bus 51 which is coupled to a processing system 47 and a volatile memory 49 and a non-volatile memory 50. The processing system 47 may be a microprocessor from Intel which is coupled to an optional cache 48. The bus 51 interconnects these various components together and also interconnects these components to a display controller and display device 52 and to peripheral devices such as input/output (I/O) devices 53 which may be mice, keyboards, modems, network interfaces, printers and other devices which are well known in the art. Typically, the input/output devices 53 are coupled to the system through input/output controllers. The volatile memory 49 is typically implemented as dynamic RAM (DRAM) which requires power continually in order to refresh or maintain the data in the memory. The nonvolatile memory 50 is typically a magnetic hard drive, a flash semiconductor memory, or a magnetic optical drive or an optical drive or a DVD RAM or other types of memory systems which maintain data (e.g. large amounts of data) even after power is removed from the system. Typically, the nonvolatile memory 50 will also be a random access memory although this is not required. While FIG. 7 shows that the nonvolatile memory 50 is a local device coupled directly to the rest of the components in the data processing system, it will be appreciated that the present invention may utilize a nonvolatile memory which is remote from the system, such as a network storage device which is coupled to the data processing system through a network interface such as a modem or Ethernet interface. The bus 51 may include one or more buses connected to each other through various bridges, controllers and/or adapters as is well known in the art.

It will be apparent from this description that aspects of the present invention may be embodied, at least in part, in software. That is, the techniques may be carried out in a computer system or other data processing system in response to its processor, such as a microprocessor, executing sequences of instructions contained in a machine readable storage medium such as a memory (e.g. memory 49 and/or memory 50). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processing system 47.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method comprising:
   identifying by a machine, within a document, a first language of a first portion of the document;
   identifying by the machine, within the document, a second language, distinct from the first language, of a second portion of the document; and
   performing a modifying function on at least one of the first and the second portions, wherein the modifying function is based at least in part on the identification of at least one of the first and second languages, and the modifying function checks a correctness of the identification of at least one of the first and second languages;
   wherein the correctness is determined by the modifying function based at least in part on errors detected when performing the modifying function;
   further comprising identifying by the machine, which of the first and the second portions is being operated on currently by a user and dynamically selecting modifying functions based on the portion being currently operated on;
   wherein the machine dynamically, as the user types in either of the first and the second portions, selects between a spell checker function for the first language in the first portion, and a spell checker function for the second language in the second portion.

2. The method as in claim 1 wherein the first and second portions of the document are one or more words.

3. The method as in claim 1 wherein the identification of the language is subject to user override.

4. The method of claim 1, wherein the first and second languages are selected from a group consisting of English, Italian, French, Russian, Ukrainian, and Latin.

5. The method of claim 1, wherein the modifying function is invoked by the user.

6. The method of claim 1, wherein the modifying function is invoked automatically by the machine.

7. The method of claim 1, wherein the modifying function is a member of a group consisting of:
   a spellchecking function;
   a grammar checking function; and
   a hyphenation function.

8. The method of claim 1, wherein the correctness is determined based at least in part on the amount of the errors detected by the modifying function.

9. The method of claim 1, wherein the correctness is determined based at least in part on the type of the errors detected by the modifying function.

10. The method of claim 1, the method further comprising:
in accordance with a determination that at least one of the first and second languages is not correct, identifying an alternative language, wherein the alternative language is identified based at least in part on errors detected when performing a modifying function that is based at least in part on the alternative language.

11. The method of claim 1, wherein performing the modifying function comprises performing the modifying function on both the first and the second portions of the document, based at least in part on the identification of the first and second languages, wherein the modifying function checks a correctness of the identification of both the first and second languages.

12. A non-transitory machine-readable storage medium storing instructions which when executed by a data processing system cause the data processing system to perform a method of processing data, the method comprising:
   identifying by a machine, within a document, a first language of a first portion of the document;
   identifying by the machine, within the document, a second language, distinct from the first language, of a second portion of the document; and
   performing a modifying function on at least one of the first and the second portions, wherein the modifying function is based at least in part on the identification of at least one of the first and second languages, and the modifying function checks a correctness of the identification of at least one of the first and second languages;
   wherein the correctness is determined by the modifying function based at least in part on errors detected when performing the modifying function;
   further comprising identifying by the machine, which of the first and the second portions is being operated on currently by a user and dynamically selecting modifying functions based on the portion being currently operated on;
   wherein the machine dynamically, as the user types in either of the first and the second portions, selects between a spell checker function for the first language in the first portion, and a spell checker function for the second language in the second portion.

13. A data processing system comprising:
   means for identifying by a machine, within a document, a first language of a first portion of the document;
   means for identifying by the machine, within the document, a second language, distinct from the first language, of a second portion of the document; and
   means for performing a modifying function on at least one of the first and the second portions, wherein the modifying function is based at least in part on the identification of at least one of the first and second languages, and means for the modifying function checking a correctness of the identification of at least one of the first and second languages;
   wherein the correctness is determined by the modifying function based at least in part on errors detected when performing the modifying function;
   further comprising means for identifying by the machine, which of the first and the second portions is being operated on currently by a user and dynamically selecting modifying functions based on the portion being currently operated on;
   wherein the machine dynamically, as the user types in either of the first and the second portions, selects between a spell checker function for the first language in the first portion, and a spell checker function for the second language in the second portion.

* * * * *